(No Model.)
L. THÉNOT.
AMALGAMATOR.
No. 247,587. Patented Sept. 27, 1881.
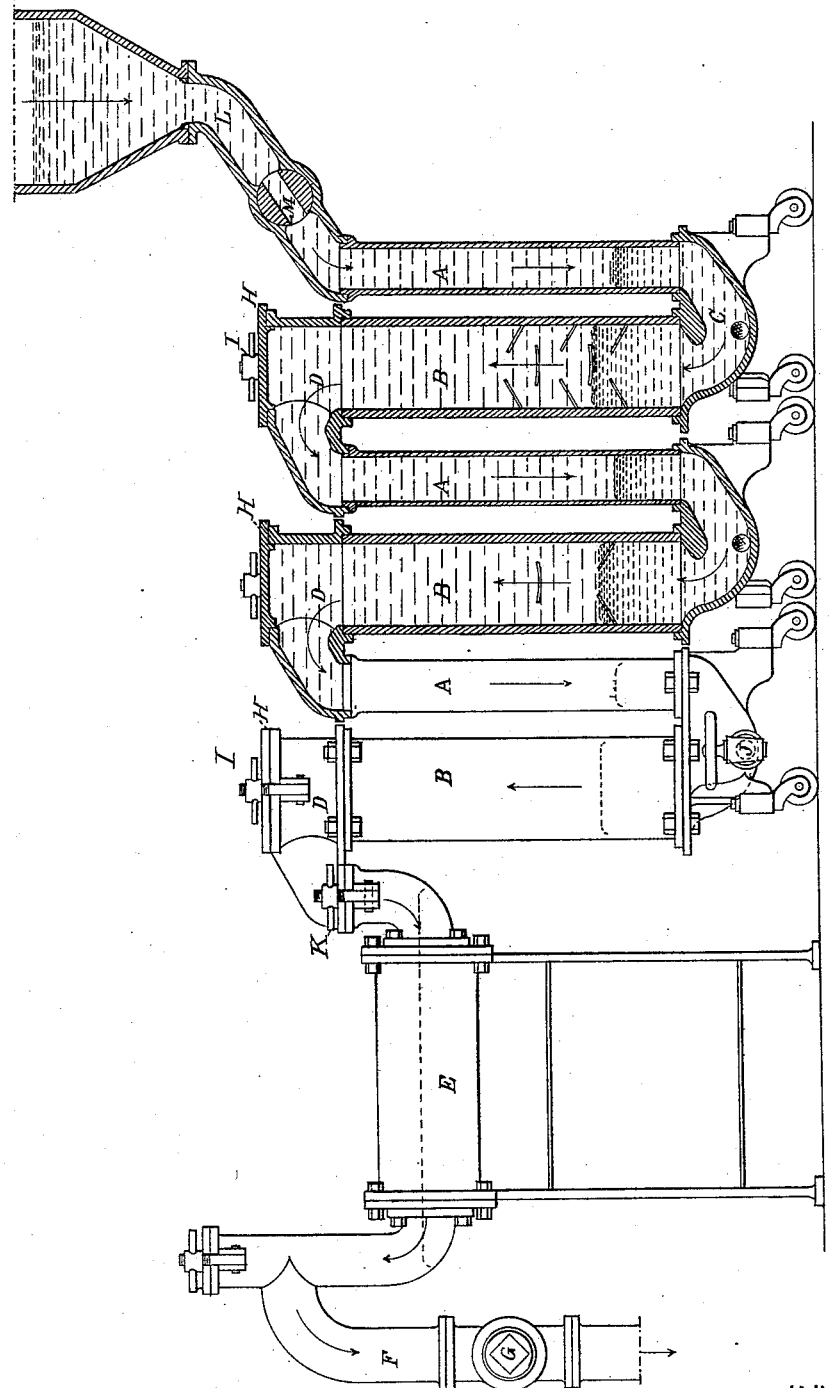
ATTEST:
Julian A. Hurdle.
John J. Diffley
INVENTOR:
Louis Thénot.
by B. C. Townsend
Atty

United States Patent Office.

LOUIS THÉNOT, OF MACON, FRANCE.

AMALGAMATOR.

SPECIFICATION forming part of Letters Patent No. 247,587, dated September 27, 1881.

Application filed April 1, 1881. (No model.) Patented in France December 23, 1880.

*To all whom it may concern:*

Be it known that I, LOUIS THÉNOT, Doctor of Physic, a citizen of the Republic of France, and residing in Macon, France, have invented certain Improvements in Amalgamators, of which the following is a specification.

My improved apparatus for the extraction of gold from quartz and auriferous sand and soil is based upon the passage of the ore, carried by a stream of water once or repeatedly through columns of quicksilver having columns of water above them. This apparatus may also be applied to the treatment of silver ore and that of any metal which it may be desirable to treat by amalgamation.

The drawing hereunto annexed represents, half in section, half in elevation, the apparatus which I use.

This apparatus is composed of a variable number of sections, divisions, or separable parts, each division comprising two vertical tubes, A and B, of different diameter, joined at their lower part by a V-shaped tube, C.

These divisions are united at the top by caps D, with two unions, forming an elbow-pipe. They are set upon wheels, so as to constitute so many small carriages, easily removed or put into position.

At the end by which the spent material escapes is a cylinder, E, which may be horizontal or slightly inclined toward the apparatus, and to which is connected a discharge-pipe, F, having a cock, G.

The caps D of the tubes have a movable cover or plate, H, tightening down by a screw, I. At the lower part of each union C is a discharge-cock, J.

A certain quantity of quicksilver is introduced into the apparatus through the openings at H, this quicksilver rising to any desired height in the two tubes A and B. The lid or cover K serves in the same way for the introduction of the quicksilver into the cylinder E. The apparatus is then completely filled with water.

A real siphon has thus been formed, working in the ordinary way. This done, the treatment of the auriferous sand or soil, or of metalliferous earths generally, may now take place, either by the aid of a column of water under pressure or operating by exhaust.

In the first case, the water mixed with the crushed earth or ore descends from a somewhat elevated reservoir and enters the apparatus by the tube L. The mixture descends in the tube A, rises in the tube B, and goes successively into the following pair or series of divisions or sections, in which it travels in the same way. Finally, it passes through the cylinder E and escapes by the discharge-pipe F.

The cock M regulates the admission of the materials to be treated, and the cock G regulates the issue of the spent matters.

In its continuous passage through the siphon the mixture of water and of sand or soil passes alternately through columns of quicksilver and columns of water. The first retain the metallic parts, which, by reason of their relative density, remain at the bottom of the unions C and amalgamate together.

If some particles have escaped the action of the quicksilver, they reach the column of water; but there their specific gravity—much greater than that of water—causes them to immediately fall back to the bottom of the tubes. It is the same with the globules of quicksilver which are formed by the agitation of the earth and the water in the apparatus. These globules, carried away by the stream, separate from it in the tubes B, the large section of which (compared with that of the tubes A) very sensibly lessens the rapidity of the current. This speed may be further reduced in the tubes B, while at the same time increasing the agitation by arranging obstructions or divergents, as shown on the drawing. No obstructions will, however, be placed in the last tube B, the large section of which will have the effect of producing comparative calm or rest, owing to which the separation of the last metallic particles carried thereto will inevitably take place.

By excess of precaution the matters pass in the cylinder or tube E upon the surface of a bath of quicksilver, which, if necessary, completes the exhaustion of the sand or soil and retains any globules of quicksilver which may have been carried thus far.

The upper reservoir, from whence starts the mixture of water and earth, is placed at a sufficient height to permit the pressure of the liquid column to determine a slow and continuous progression of the mixture through the apparatus.

It will be understood that by a proper choice in the height of the reservoir the number and the dimensions of the divisions or series of pairs of vertical tubes, and by regulating the opening of the cocks M and G, the earths or matters issuing from the apparatus will be completely exhausted. Further, if it is desired to employ only a few divisions or pairs of tubes A and B, there is no objection to repassing the matters already treated several times through the apparatus.

It is desirable to place at the commencement of the tube L a float-valve, closing automatically directly the supply of the mixture of earth and water ceases, so as to keep the apparatus always primed.

When operating by exhaust an exhaust apparatus is placed at the end of the discharge-pipe F. This apparatus may be a pump, a fan, a jet of steam or compressed air, or any other means of producing the same result. In this case the column of liquid under pressure is dispensed with, and any direction may be given to the pipe L to seek the mixture of water and soil, or, if preferred, soil only. Everything then goes on as already above described, the cocks M and G still serving to regulate the flow or passage of material in the apparatus.

It need scarcely be observed that both means—namely, pressure from a column of liquid and exhaust—may be used simultaneously.

Instead of the ordinary cock, G, shown on the drawing, it will be advantageous to use a cock the key of which will be of one piece with a screw. On the head of this screw will be set an index moving in front of a dial or of a divided and graduated sector. Thus, the apparatus being regulated, the point of the sector to which the index should be brought to obtain a fixed delivery will be exactly known.

Finally, it is well to provide for the disengagement and accumulation of air at the upper part of the apparatus, which would in the end stop the flow. Several means can be employed for preventing this inconvenience. For instance, there can be placed above the first pipe B a closed vessel containing water, and placed in communication with the upper part of the pipe by two tubes, opening, the one in the upper part, the other in the lower part, of the closed vessel.

It will be understood that the air which rises into this vessel will be immediately replaced by an equal amount of water introduced into the siphon.

In conclusion, I would observe that my apparatus is so arranged that the treatment of quartz or metalliferous earths or matters is absolutely methodical. In fact, the first bath of quicksilver in contact with the fresh earths or material saturates itself more than the second, the second more than the third, and so on.

When it is considered that the first division, siphon, or pair of vertical tubes contains only saturated quicksilver, it is detached, removed, the whole remainder of the apparatus is brought nearer to the feed-pipe L, and there is placed at the end, in front of the cylinder E, a siphon charged with virgin quicksilver.

The richness of the quicksilver in gold, silver, or other metal keeps decreasing from the beginning to the end, the virgin quicksilver being in contact with nearly-exhausted material. The treatment is therefore, as I have already stated, methodical.

It will be understood that the shape and dimensions of my apparatus may vary, as well as the material of which it is composed. The cylinders A and B may be of glass, of cast-iron, or other suitable metal. In this latter case I may set in the sides and diametrically opposite two glass lenses, to permit inspection of what is taking place within.

I claim as my invention—

1. A sectional amalgamating apparatus consisting of pairs of tubes separately mounted upon trucks, one tube of each pair being larger than the other, means for connecting and disconnecting the tubes of adjoining sections at pleasure, and deflector-plates attached in a diagonal position to the inside of the larger tube in each pair, substantially as described and shown.

2. The combination, in an amalgamating apparatus, of pairs of vertical tubes united at their bottoms and mounted upon trucks, and means for connecting and disconnecting each pair to another and to the supply and the outlet-pipe at pleasure, substantially as described.

3. In a sectional amalgamating apparatus constructed substantially as described, two or more pairs of tubes united at their bottom, each pair being mounted upon an independent platform, so as to be independently portable, in combination with separable elbow or U-pipes, adapted to unite the tubes of adjoining pairs or sections, all as set forth.

4. An amalgamating apparatus composed of two or more sections, each consisting of a pair of tubes, one of larger diameter than the other, with a uniting-tube at the bottom of each pair, a platform-truck for each pair of tubes, and means for separably uniting the larger tube of one pair to the smaller tube of the adjoining pair, substantially as described.

In testimony whereof I have signed my name to this specification in the presence of two subscribing witnesses.

LOUIS THÉNOT.

Witnesses:
 NOTEDUF,
 JOSEPH DELAGE,
  *City of Paris, France.*